(12) United States Patent
He

(10) Patent No.: US 10,646,068 B2
(45) Date of Patent: May 12, 2020

(54) MULTIPURPOSE COOKER

(71) Applicant: Foshan Shunde Aide Industry Co., Ltd., Foshan (CN)

(72) Inventor: Zhigang He, Foshan (CN)

(73) Assignee: Foshan Shunde Aide Industry Co., Ltd., Foshan (CN)

( * ) Notice: Subject to any disclaimer, the term of this patent is extended or adjusted under 35 U.S.C. 154(b) by 243 days.

(21) Appl. No.: 15/952,266

(22) Filed: Apr. 13, 2018

(65) Prior Publication Data

US 2019/0223658 A1 Jul. 25, 2019

(30) Foreign Application Priority Data

Jan. 23, 2018 (CN) .................. 2018 2 01061985 U

(51) Int. Cl.
| | |
|---|---|
| *A47J 36/32* | (2006.01) |
| *H05B 1/02* | (2006.01) |
| *A47J 36/16* | (2006.01) |
| *A47J 27/00* | (2006.01) |

(52) U.S. Cl.
CPC ............ *A47J 36/32* (2013.01); *A47J 27/004* (2013.01); *A47J 36/16* (2013.01); *H05B 1/0261* (2013.01)

(58) Field of Classification Search
CPC .......... A47J 36/32; A47J 36/16; A47J 27/004; H05B 1/0261
See application file for complete search history.

(56) References Cited

U.S. PATENT DOCUMENTS

| | | | | |
|---|---|---|---|---|
| 5,191,831 A | * | 3/1993 | Walden ................... | A47J 27/16 126/369 |
| 2012/0107476 A1 | * | 5/2012 | McLemore ............. | A47J 37/07 426/523 |
| 2015/0289718 A1 | * | 10/2015 | Gross .................... | A47J 37/079 126/25 B |
| 2016/0206131 A1 | * | 7/2016 | Chien ...................... | A47J 27/09 |
| 2018/0049577 A1 | * | 2/2018 | Shi ......................... | A47J 27/002 |

* cited by examiner

*Primary Examiner* — Ryan J. Walters
(74) *Attorney, Agent, or Firm* — CBM Patent Consulting, LLC

(57) ABSTRACT

A multipurpose cooker is composed of a base, a cooker body, cooker feet, a cooker cover, a cooker cover handle, cooker lugs, and a panel assembly and an operating mechanism on the cooker body; and an inner cooker is arranged in the cooker body, characterized in that, a food plate is arranged at the bottom of the inner cooker, a groove hole for placing heating members is opened in the middle of the food plate, and a heating tube as well as a seasoning box and a seasoning box cover outside the heating tube are arranged in the groove hole; and peripheral heating rings are also arranged in the side wall of the inner cooker.

4 Claims, 3 Drawing Sheets

MULTIPURPOSE COOKER

This application claims priority to Chinese Patent Application Ser. No. CN2018201061985 filed on 23 Jan. 2018.

TECHNICAL FIELD

The invention relates to the technical field of electric cookers, in particular to a multipurpose cooker.

BACKGROUND ART

As a household cooking appliance, electric cookers have been widely used. Its convenience and safety in use are of the greatest concern to the users. The existing multipurpose cookers generally realize heating by the heating plate at the bottom of the cooker, whereas such thermal conversion has a limited coverage, resulting in that the cooker bottom is burnt, but the cooker body is not hot enough, and consequently the food on the upper separating plate is not hot enough to affect the cooking of food.

SUMMARY OF THE INVENTION

The invention provides a multipurpose cooker which has high thermal efficiency and is more convenient and safer in use, in order to solve the disadvantages in the prior art.

The invention achieves the above objective by the technical solutions below:

The multipurpose cooker is mainly composed of a base, a cooker body, cooker feet, a cooker cover, a cooker cover handle, cooker lugs, and a panel assembly and an operating mechanism on the cooker body; and an inner cooker is arranged in the cooker body, characterized in that, a food plate is arranged at the bottom of the inner cooker, a groove hole for placing heating members is opened in the middle of the food plate, and a heating tube as well as a seasoning box and a seasoning box cover outside the heating tube are arranged in the groove hole; and peripheral heating rings are also arranged in the side wall of the inner cooker.

Several layered racks stacked vertically are also arranged in the inner cooker, and the layered racks are externally connected with a lifting rack; the layered racks are composed of several concentric circular rings and radial straight tubes outside the circular rings; the lifting rack is composed of an oblong circular tube, of which the upper part is higher than the layered rack and at the top the lower part extends out of the layered rack at the bottom.

The cooker cover is provided with an air outlet and a detachable sealing plug, and a sealing ring is sleeved on the outer ring of the cooker cover.

Both pins of the heating tube are provided with flange nuts which are fixed with a base frame through nut rubber gaskets, and the lower part of the food plate is mainly provided with the base frame and a power PCB board connected with the heating tube; the panel assembly is composed of a panel and a microcomputer control board, and the microcomputer control board is electrically connected with the power PCB board.

A temperature sensor is installed on the peripheral heating rings, and the middle heating tube and the peripheral heating rings are controlled to heat by the temperature measured by the microcomputer control board and the set cooking mode.

The groove hole of the food plate is externally provided with a turned edge; the seasoning box in the groove hole is a cylinder, and the side surface is provided with several small holes.

By adopting the above technical solutions, the invention has the advantages that the invention is provided with several layers of layered racks arranged in the inner cooker and several peripheral heating rings surrounded on the side wall, it changes the previous structures of single-layer or multi-layer separating plates, so that the food in the cooker can be uniformly heated to improve the taste of the food; in addition to the linked control assembly arranged in the base, it is safer and more convenient in use.

Marker notes of drawings: 1. Base, 2. Cooker body, 3. Cooker foot, 4 Panel assembly, 5. Air outlet, 6. Inner cooker, 7, Cooker body handle, 8. Sealing plug, 9. Cooker cover handle, 10. Cooker cover, 11. Sealing ring, 12. Layered rack, 13. Lifting rack, 14. Seasoning box cover, 15. Seasoning box, 16. Food plate, 17. Heating tube, 18. Base frame, 19. Power PCB board box, 20. peripheral heating ring, 21. Power PCB board

DETAILED DESCRIPTION OF THE PREFERRED EMBODIMENTS

Figure 1:
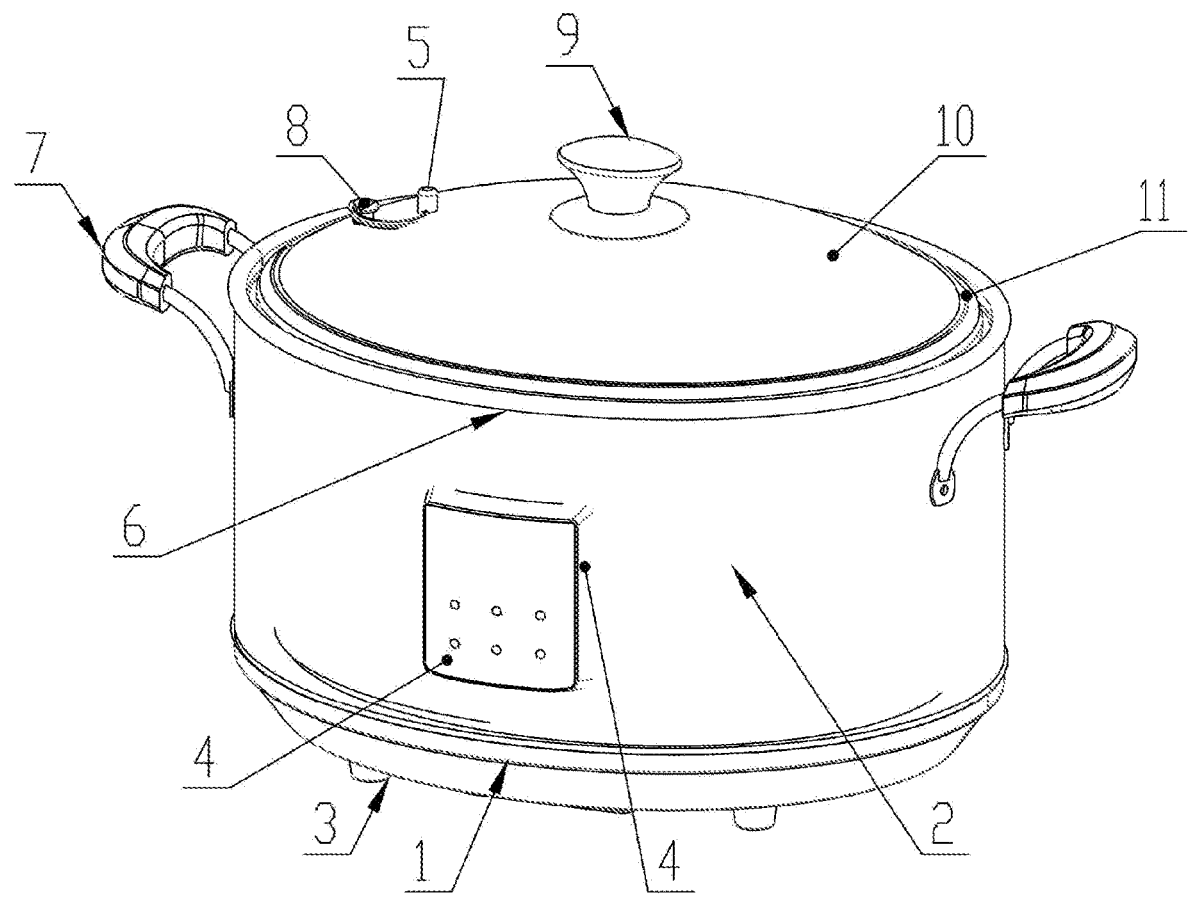
FIG. 1 shows the outside structural structure of the invention.
Figure 2:
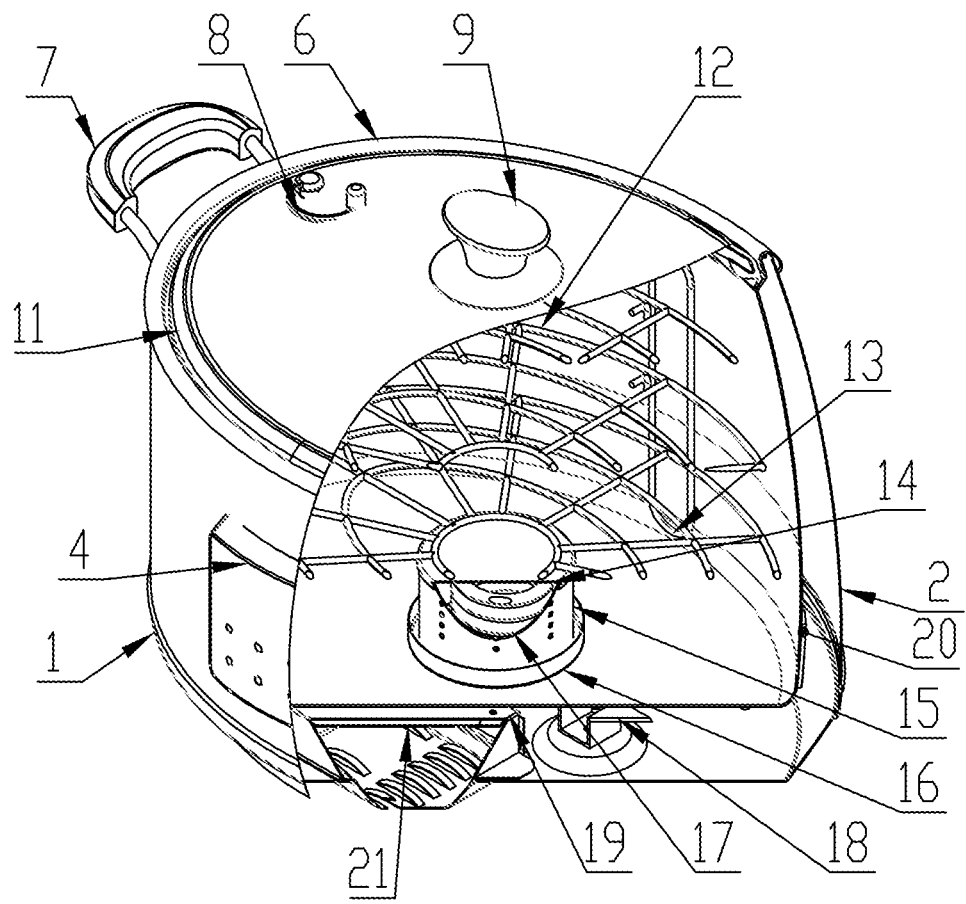
FIG. 2 shows the sectional view of the invention.
Figure 3:
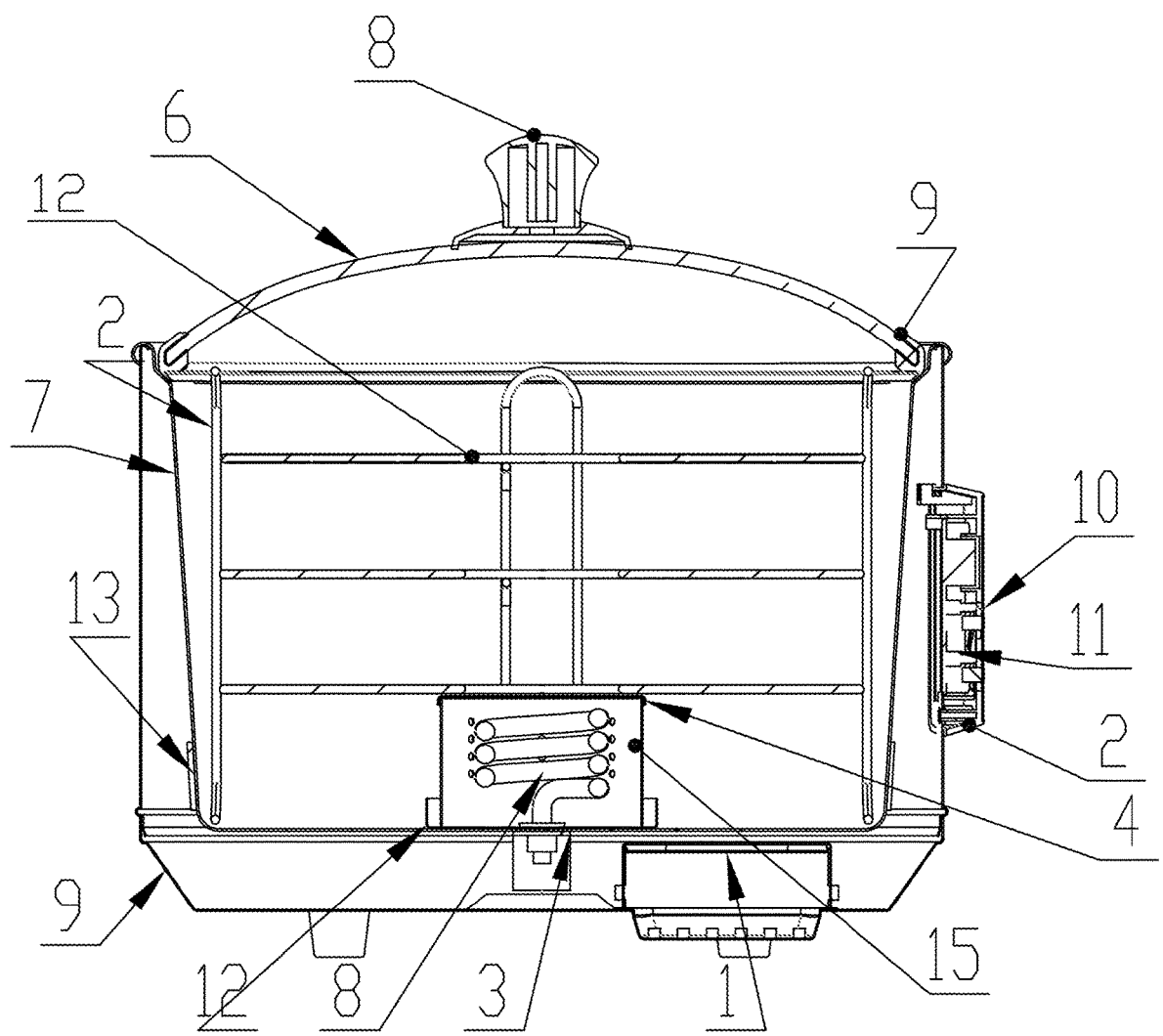
FIG. 3 shows the lateral sectional view of components of the invention.

As shown in FIG. 1-3, a multipurpose cooker of the invention is mainly composed of a base 1, a cooker body 2, cooker feet 3, a cooker cover 10, a cooker cover handle 9, cooker lugs 7, and a panel assembly 4 and an operating mechanism on the cooker body. An inner cooker 6 is arranged in the cooker body 2, a food plate 16 is arranged at the bottom of the inner cooker, a groove hole for placing heating members is opened in the middle of the food plate, and a heating tube 17 as well as a seasoning box and a seasoning box cover outside the heating tube are arranged in the groove hole; the inner cooker is arranged in the center of the bottom, the heating tube 17 is installed in the middle, and the food plate 16 is under the middle heating tube 17; both pins of the heating tube 17 are provided with flange nuts which are fixed with a base frame 18 through nut rubber gaskets. Peripheral heating rings 20 are also arranged in the side wall of the inner cooker 6. The external periphery of the inner cooker 6 is sleeved on the outer shell of the cooker body 2, the periphery is surrounded by the peripheral heating rings 20, the heating rings 20 are tightened by tension springs or screws, and accordingly they can closely adhere to the outer wall of the inner cooker 6, so that they can fully transfer the heat. Several layered racks stacked vertically are also arranged in the inner cooker, and the layered racks are externally connected with a lifting rack; the layered racks 12 are composed of several concentric circular rings and radial straight tubes outside the circular rings; the lifting rack 13 is composed of an oblong circular tube, of which the upper part is higher than the layered rack 12 and at the top the lower part extends out of the layered rack 12 at the bottom. The cooker cover 10 is provided with an air outlet 5 and a detachable sealing plug 8, the air outlet can be plugged or opened selectively according to the cooking mode, and a sealing ring 11 is sleeved on the outer ring of the cooker cover 10. Both pins of the heating tube 17 are provided with flange nuts which are fixed with a base frame through nut rubber gaskets, and the lower part of the food plate 16 is mainly provided with the base frame 18, a power PCB board 21 connected with the heating tube 17, and a power PCB board box 19; the panel assembly 4 is composed of a panel and a microcomputer control board, and the microcomputer control board is electrically connected with the power PCB board. A temperature sensor is installed on the peripheral heating rings 20, and the middle heating tube 17 and the peripheral heating rings 20 are controlled to heat by the temperature measured by the microcomputer control board and the set cooking mode. The groove hole of the food plate 16 is externally provided with a turned edge; the seasoning box 15 in the groove hole is a cylinder, and the side surface is provided with several small holes.

The different combinations of the above structures enable the product to have the following cooking functions:

(1) Stewing Function

Remove the layered racks, the lifting rack, the seasoning box and the seasoning box cover. Put food and water in the inner cooker directly, and heat by the peripheral heating rings.

(2) Boiling Water

Remove the layered racks, the lifting rack, the seasoning box and the seasoning box cover. Put water in the inner cooker directly, and heat by the peripheral heating rings and the middle heating tube at the same time.

(3) Steaming

Put a small amount of water in the inner cooker, place the lifting rack and the layered racks, put food on the layered racks, and heat by the peripheral heating rings.

(4) Baking

Place the lifting rack and the layered racks, put food on the layered racks, and heat by the peripheral heating rings and the middle heating tube at the same time.

(5) Smoking

Put the seasoning box on the middle heating tube, put seasonings in the seasoning box, close the seasoning box cover, place the lifting rack and the layered racks, put food on the layered racks, and plug the air outlet of the cooker cover by the sealing plug. Heat the seasonings by the middle heating tube to produce smoke which can be released into the inner cooker through the holes on the seasoning box, so that the effect of smoking food can be achieved. According to the cooking need, the food can be thoroughly boiled or baked by heating in match with the peripheral heating rings.

The invention is not limited to the above modes of executions, and other similar and equivalent structures shall all belong to the protective range of the invention without repeated descriptions hereby.

What is claimed is:

1. A multipurpose cooker comprising a base, a cooker body, cooker feet, a cooker cover, a cooker cover handle, cooker lugs, and a panel assembly and an operating mechanism on the cooker body; and an inner cooker is arranged in the cooker body, characterized in that, a food plate is arranged at the bottom of the inner cooker, a groove hole for placing heating members is opened in middle of the food plate, and a middle heating tube as well as a seasoning box and a seasoning box cover outside the middle heating tube are arranged in the groove hole; and peripheral heating rings are also arranged in side wall of the inner cooker;

wherein, several layered racks stacked vertically are also arranged in the inner cooker, and the layered racks are externally connected with a lifting rack; the layered racks are composed of several concentric circular rings and radial straight tubes connecting the circular rings; the lifting rack is composed of an oblong circular tube, of which the upper part is higher than the layered racks and at the top the lower part extends out of the layered racks at the bottom;

the layered racks, the lifting rack, the seasoning box and the seasoning box cover are removable;

a temperature sensor is installed on the peripheral heating rings, and the middle heating tube and the peripheral heating rings are controlled to heat by the temperature measured by a microcomputer control board and a set cooking mode.

2. The multipurpose cooker according to claim 1, characterized in that, the cooker cover is provided with an air outlet and a detachable sealing plug, and a sealing ring is sleeved on the outer ring of the cooker cover.

3. The multipurpose cooker according to claim 1, characterized in that, both pins of the middle heating tube are provided with flange nuts which are fixed with a base frame through nut rubber gaskets, and the lower part of the food plate is provided with the base frame and a power PCB board connected with the middle heating tube; the panel assembly is composed of a panel and the microcomputer control board, and the microcomputer control board is electrically connected with the power PCB board.

4. The multipurpose cooker according to claim 1, characterized in that, the groove hole of the food plate is externally provided with a turned edge; the seasoning box in the groove hole is a cylinder, and the side surface is provided with several small holes.

* * * * *